United States Patent
Langendorf et al.

(10) Patent No.: US 6,313,766 B1
(45) Date of Patent: *Nov. 6, 2001

(54) METHOD AND APPARATUS FOR ACCELERATING SOFTWARE DECODE OF VARIABLE LENGTH ENCODED INFORMATION

(75) Inventors: Brian K. Langendorf; Brian Tucker, both of El Dorado Hills, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,008

(22) Filed: Jul. 1, 1998

(51) Int. Cl.[7] ....................................................... G06F 15/00
(52) U.S. Cl. ............................. 341/67; 712/210; 712/23; 341/65
(58) Field of Search ................................. 712/23, 36, 200, 712/247, 248, 210; 709/217; 341/65, 67, 106

(56) References Cited

U.S. PATENT DOCUMENTS

| | | | |
|---|---|---|---|
| 5,220,325 | * 6/1993 | Ackland et al. | 341/67 |
| 5,436,626 | * 7/1995 | Fujiwara et al. | 341/67 |
| 5,502,493 | * 3/1996 | Meyer | 348/845 |
| 5,559,557 | * 9/1996 | Kato | 348/405 |
| 5,644,305 | 7/1997 | Inoue et al. . | |
| 5,708,430 | * 1/1998 | Sohn | 341/67 |
| 5,861,922 | 1/1999 | Murashita et al. . | |

* cited by examiner

Primary Examiner—Eddie Chan
Assistant Examiner—Mackly Monestime
(74) Attorney, Agent, or Firm—Calvin E. Wells (57) ABSTRACT

A method and apparatus to accelerate variable length decode is disclosed. The system includes a logic device to receive a bit stream of variable length encoded information. The logic device outputs a fixed length value corresponding to a variable length code received as part of the bit stream of the variable length encoded information. The system also includes a processor to receive the fixed length value. The processor to performs a write of a coefficient to a system memory device, the coefficient corresponding to the fixed length value received from the logic device.

6 Claims, 8 Drawing Sheets

METHOD AND APPARATUS FOR ACCELERATING SOFTWARE DECODE OF VARIABLE LENGTH ENCODED INFORMATION

Reference is made to the commonly assigned copending patent application Ser. No. 09/108,884, entitled "Method and Apparatus for Initializing Data Structures to Accelerate Variable Length Decode".

BACKGROUND OF THE INVENTION

1. Field of the Invention

The present invention pertains to the field of decoding variable length encoded information in a computer system. More particularly, this invention pertains to the field of accelerating software-based variable length decode.

2. Background of the Related Art

Full-motion video applications such as Digital Versatile Disc (DVD) playback, video conferencing, video telephony, and Digital Television (DTV) as defined by the American Television Standards Committee (ATSC) are placing greater burdens on computer system processing resources. The above-mentioned applications utilize data compression algorithms in order to reduce the amount of information that must be transmitted using today's communication technologies. For example, audio and video information is compressed before stored on a DVD. The information is read off of the DVD and transmitted in compressed form to a decoding device which expands the information to reconstruct the original audio and video information. Popular compression algorithms include the Motion Picture Experts Group (MPEG) standard (ISO/IEC 11172), the MPEG2 standard (ISO/IEC 13818), and the Joint Photographers Experts Group (JPEG) standard (ISO/IEC 10918), among others. These compression algorithms use differential pulse code modulation (DPCM), a discrete cosine transform (DCT), and variable length encoding (VLE).

Variable length encoding is a technique wherein fixed length data are converted into variable length codewords according to the statistics of the data In general, the codewords are chosen so that shorter codewords are used to represent the more frequently occurring data and longer codewords are chosen to represent less frequently occurring data. In assigning codewords in this fashion, the average codeword length of the variable length code is shorter than the original code, and compression is therefore achieved. VLE decreases the redundancy in the serial bitstream.

The variable length decoding (VLD) process for variable length encoded data is complicated by the variable length nature of the codewords. The decoding device has no knowledge of the length of the current codeword as it receives bits of the codeword stream. Further, the meaning and boundary of the next codeword cannot be known until the current codeword is understood. The decoding process consists primarily of a shift and compare operation. The information to be decoded is fed serially to the decoding device. One or more bits at a time are compared with stored codewords. This compare procedure is repeated until a valid codeword is found. Once the length of the current codeword is known, the decoding device can find the beginning of the next codeword.

Figure 1:
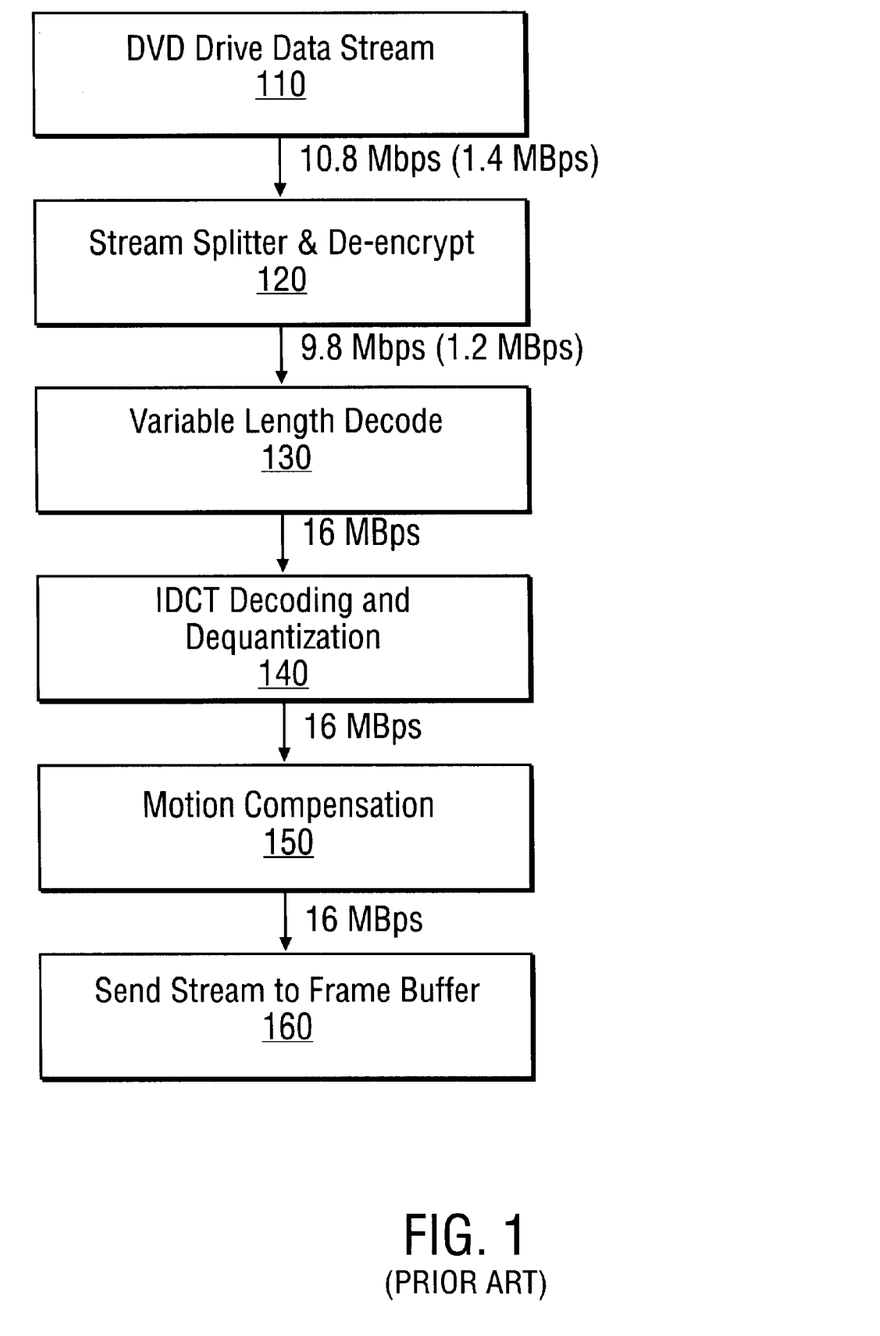
FIG. 1 shows a flow chart of a prior art process for decoding MPEG2 encoded information.

FIG. 1 shows a typical MPEG2 decode process. A data stream is received at step 110. For this example, the data stream is from a DVD player. The DVD player outputs the data stream at a maximum rate of 1.4 MBytes per second (MBps). At step 120, the data stream is split into an audio stream and a video stream. The video stream is output from this step at a maximum rate of 1.2 MBps. The next step is a VLD step 130. The VLD process is briefly described above. The video stream exits the VDL step 130 at a maximum rate of approximately 16 MBps. Following the VLD step 130 is an inverse discrete cosine transform (IDCT) step 140, followed in turn by a motion compensation step 150. The final step in the process is step 160 where the data stream is sent to a frame buffer for display.

Prior implementations of the process discussed above in connection with FIG. 1 have been either essentially completely hardware based or implemented in software with a general purpose processor performing the various steps. The motion compensation step is sometimes accelerated through mechanisms in a graphics controller. When motion compensation is hardware accelerated by the graphics controller, the data from the IDCT step would be written into a local frame buffer, or memory location accessible by the graphics controller. The graphics controller would then do the final render into the frame buffer. The hardware based implementations have the advantage of not burdening the computer system's processor with the decode process. The disadvantage of the hardware based implementation is the extra cost associated with providing extra hardware to perform the various decode functions. The software based implementations have the advantage of lower cost, but also have the disadvantage of utilizing a great deal of the processor's computing resources. In many cases the processor is not able to perform the decode tasks quickly enough to provide high quality images.

Figure 2:
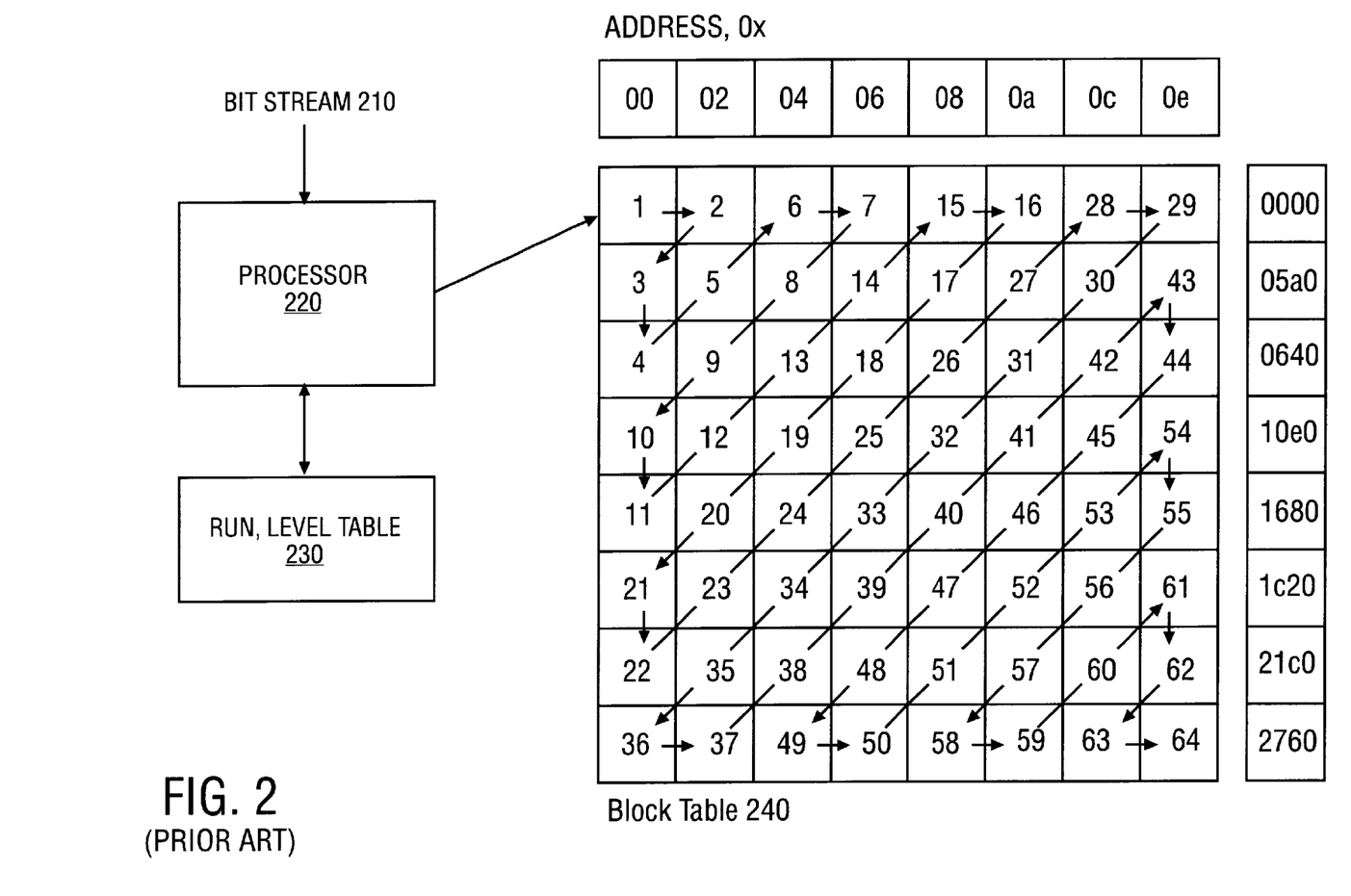
FIG. 2 illustrates a prior art system for performing the VLD portion of the MPEG2 decode process.

A large drain on processor computing resources is the VLD step. A typical prior processor based VLD operation that is part of an MPEG2 process is shown in FIG. 2. A bit stream 210 containing variable length encoded information is read by a processor 220. The processor then must perform the shift and compare process discussed above to find the code boundaries. The processor 220 then compares the code values with a run/level table 230. The run/level table 230 contains run of zeros and level coefficients that are to be written to the 8×8 block table 240 in memory. The block table 240 contains coefficients that will be used by the IDCT. The values in the block table 240 are typically 10 bit, stored in 16 bit cells. The run of zeros and the coefficients are written to the block table 240 in a zigzag fashion as represented by the arrows and cell numbering. An example value from the run/level table might be 5, 7 which indicates to the processor that a run of 5 zeros should be written to the block table beginning at the current cell (cell 1 if just starting to fill the block table) followed by a coefficient of 7 stored at the $6^{th}$ cell from the current cell. For the MPEG2 standard, the run/level table value of 5, 7 corresponds to the variable length code of 010010011.

A significant contributor to the processor's inability to efficiently perform the VLD operation is that, in general, processors are optimized to operate on byte, word, or double word aligned data. General purpose processors are generally not at peak efficiency when operating on bit aligned data.

SUMMARY OF THE INVENTION

A system is disclosed to accelerate variable length decode. The system includes a logic device to receive a bit stream of variable length encoded information. The logic device outputs a fixed length value corresponding to a variable length code received as part of the bit stream of variable length encoded information. The system also includes a processor to receive the fixed length value. The processor to performs a write of a coefficient to a system memory device, the coefficient corresponding to the fixed length value received from the logic device.

DETAILED DESCRIPTION

A method and apparatus for accelerating variable length decode is disclosed. In the following description, for the purposes of explanation, specific details are set forth to provide a thorough understanding of the invention. However, it will be apparent to one skilled in the art that these specific details are not required to practice the invention. In other instances, well known methods, devices, and structures are not described in particular detail in order to avoid obscuring the invention.

Embodiments of the Invention

Figure 3:
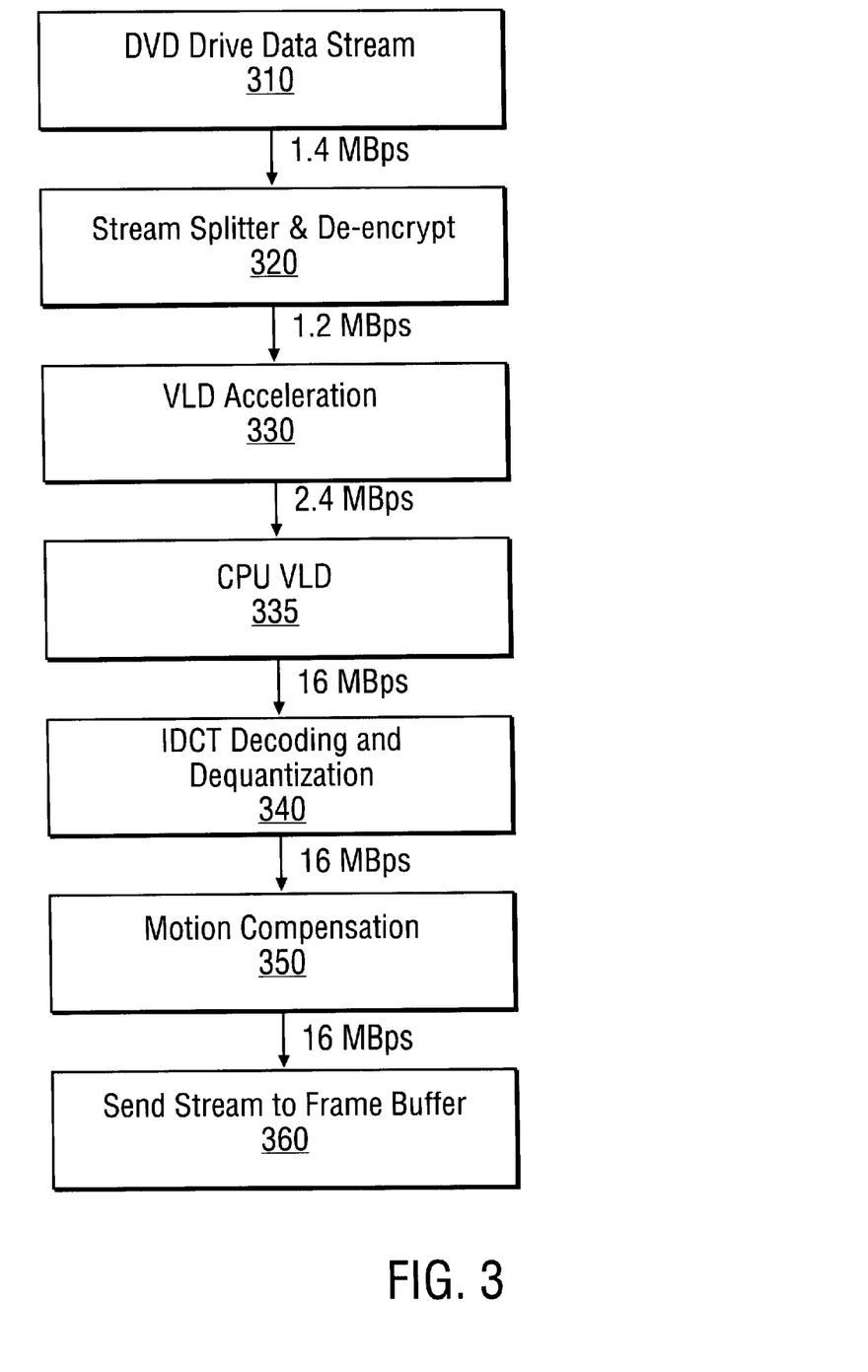
FIG. 3 is a flow chart of a process for decoding variable length encoded information implemented in accordance with the invention.

FIG. 3 is a flow chart of a process for decoding variable length encoded information. The process of FIG. 3 is similar to the process discussed above in connection with FIG. 1, with the exception that the VLD process is divided into two steps, a VLD acceleration step 330 and a CPU VLD step 335.

The first step in the process of FIG. 3 is step 310 where a data stream is received. For this embodiment, the data stream is from a DVD drive. However, the invention may be practiced with the data stream provided by any device or system that is capable of transmitting or delivering variable length encoded information. At step 320, the data stream is split into an audio stream and a video stream. The next step is the VLD acceleration step 330.

The VLD acceleration step 330 includes receiving the variable length encoded information stream and determining fixed length values corresponding to the received variable length codes. The VLD acceleration step 330 includes delivering a bit stream containing variable length encoded information in a serial manner to a serial logic device. The serial logic device decodes the incoming variable length codes and selects appropriate fixed length values. The fixed length values are passed on to a CPU, and at step 335 the CPU completes the VLD process. The fixed length values provided at step 330 are preferably indexes to a run/level table. The CPU uses the indexes to perform table look ups to determine appropriate run/level values to write to a block table in memory. The advantage to the CPU with this arrangement is that the CPU does not need to perform the previously discussed shift and compare operation which uses much of the CPU's computing resources. The fixed length value is preferably byte, word, or double word aligned.

Following the CPU VLD step 335 is an inverse discrete cosine transform (IDCT) step 340, followed in turn by a motion compensation step 350. The final step in the process is step 360 where the data stream is sent to a frame buffer for display.

Although the process described in connection with FIG. 3 is part of an MPEG2 decoding scheme, the invention may be practiced with the decode process of any variable length encoded information.

Figure 4:
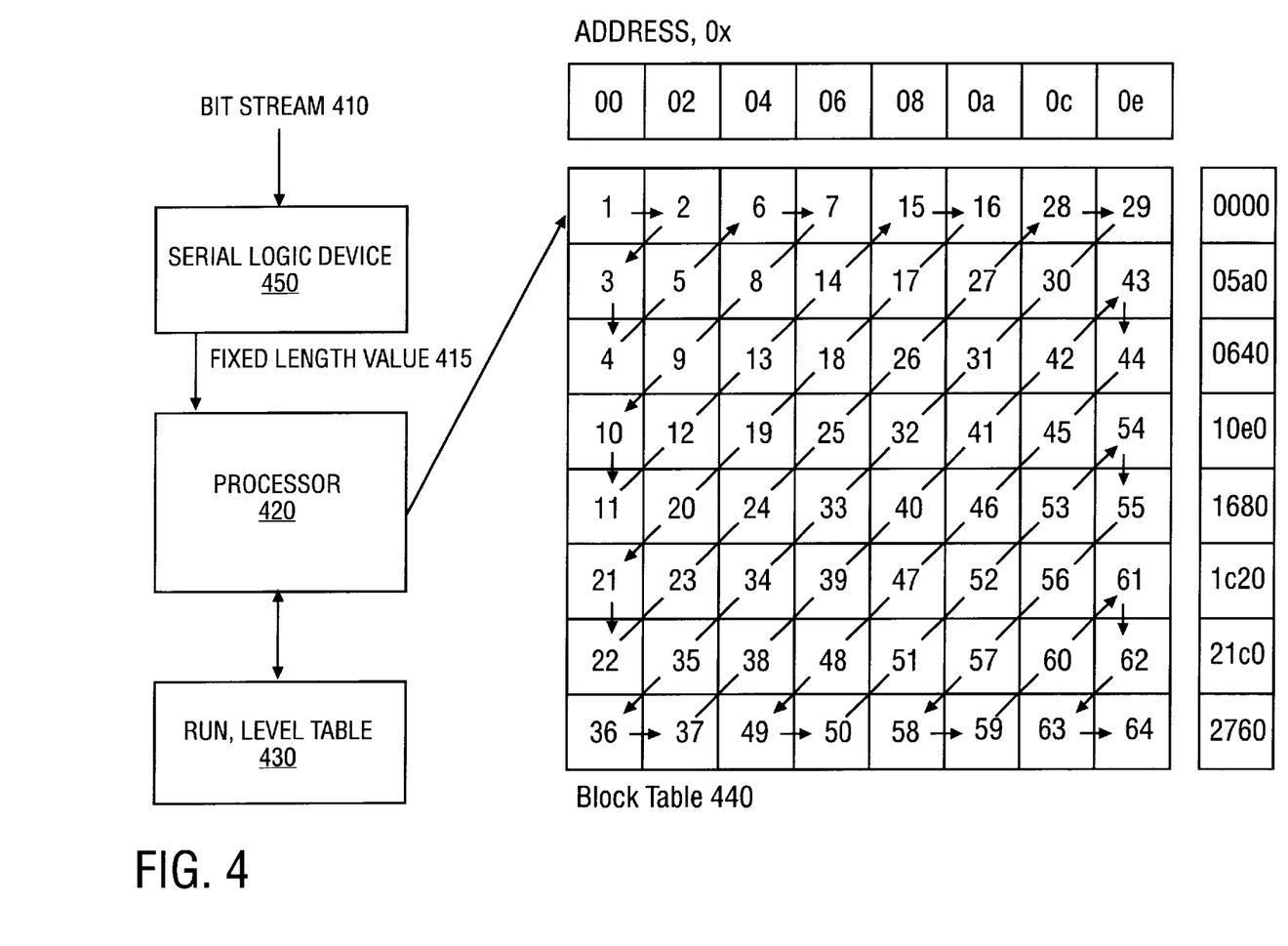
FIG. 4 is a block diagram of a system for decoding variable length encoded information implemented in accordance with the invention.

FIG. 4 is a block diagram of a system for decoding variable length encoded information. The system of FIG. 4 implements the VLD acceleration and CPU VLD steps included in the process described above in connection with FIG. 3. A bit stream 410 containing variable length encoded information is delivered in a serial manner into a serial logic device 450. The serial logic device 450 decodes the incoming variable length codes and selects appropriate fixed length values to deliver to the processor 420. The fixed length values are preferably indexes to a run/level table 430. The processor 420 uses the indexes to perform look ups to the run/level table 430. The run/level table 430 contains run of zeros and level coefficients that are to be written to a block table 440 in memory. The block table 440 contains coefficients that will be used for subsequent IDCT processing. The values in the block table 440 are preferably 10 bit, stored in 16 bit cells. The block table 440 preferably includes the same attributes as the block table 240 discussed above in connection with FIG. 2.

Figure 5:
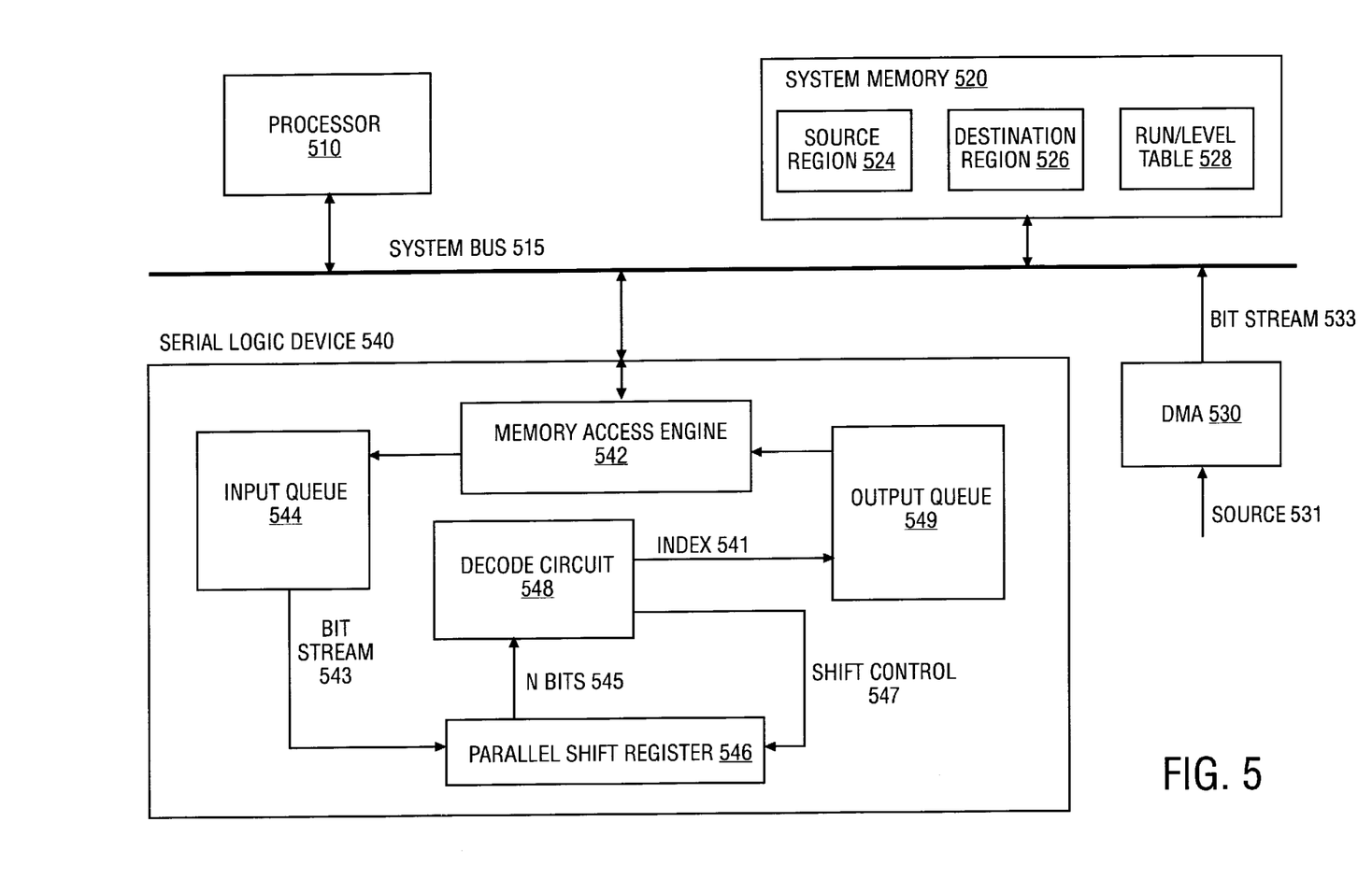
FIG. 5 is a diagram of a system for decoding variable length encoded information including a block diagram of a serial logic device implemented in accordance with the invention.

FIG. 5 is a diagram of a system for decoding variable length encoded information including a block diagram of an embodiment of a serial logic device 540. In addition to the serial logic device 540, the system of FIG. 5 includes a processor 510, a system memory 520, a Direct Memory Access (DMA) device 530, and a system bus 515. The system bus 515 is used to interconnect the processor 510, the memory 520, the DMA device 530, and the serial logic device 540. The memory device 520 includes a source region 524, a destination region 526, and a run/level table 528. The run/level table 528 is preferably created such that the table will reside in processor cache thus significantly reducing memory accesses and improving processor performance. The serial logic device 540 includes a memory access engine 542, an input queue 544, a parallel shift register 546, a decode circuit 548, and an output queue 549.

The DMA device 530 receives an input from a source 531. The source may be a DVD drive or any other device or communications medium capable of delivering variable length encoded information. The DMA device 530 delivers a bit stream 533 of variable length encoded information to the source region 524 in the system memory 520. The memory access engine 542 in the serial logic device 540 retrieves the bit stream 533 from the source region 524 and delivers the bit stream to the input queue 544. The memory access engine 542 is preferably able to perform scatter-gather type direct memory accesses. This is preferable due to the fact that in most cases groups of variable length codes included in the bit stream 533 will be separated by headers, meaning that the variable length codes may not be stored in the source region 524 in a sequential manner. Furthermore, as a result of page based memory management schemes of many operating systems, the stream of data may be stored in non-sequential pages of physical memory. The scatter-gather table is a mechanism which can be employed to communicate the physical memory locations of a large block of data to the serial logic device 540.

The input queue 543 delivers a bit stream 543 to the parallel shift register 546. The parallel shift register 546 may be loaded in a parallel manner. The parallel shift register 546 outputs n bits 545 to the decode circuit 548. The number of n bits 545 can range from 1 to the width of the largest variable length code. The number n will depend on the complexity of the decode circuit 548 and how many bits at a time the decode circuit 548 can process. Once the decode circuit 548 has received a sufficient number of bits and has decoded a variable length code, the decode circuit 548 communicates to the parallel shift register 546 the length of the decoded code via the shift control signal 547. The parallel shift register 546 will then shift its contents an appropriate number bits in response to the communication.

The decode circuit also outputs an index 541 for each decoded variable length code. Each variable length code is preferably assigned a unique index value. The indexes are used by the processor 510 to perform look ups to the run/level table 528. The indexes output by the decode circuit 548 are stored in the output queue 541, and later delivered by the memory access engine 542 to the destination region 526. The processor reads the indexes from the destination region 526 and performs look ups to the run/level table 528. In this manner the processor determines the appropriate run and level values to be written to a block memory (not shown) for each index read from the destination region 526.

Although the discussion above in connection with FIG. 5 includes the DMA device 530 and the memory access engine 542 performing much of the memory accesses, it is possible to practice the invention with the processor 510 performing all of the memory accesses. Further, the invention may be practiced with a broad range of computing systems and devices, not only with the specific system as set forth in the discussion above and shown in FIG. 5. The specific embodiments shown in FIGS. 3 through 8 are meant merely as example embodiments. Other variations are possible.

Figure 6:
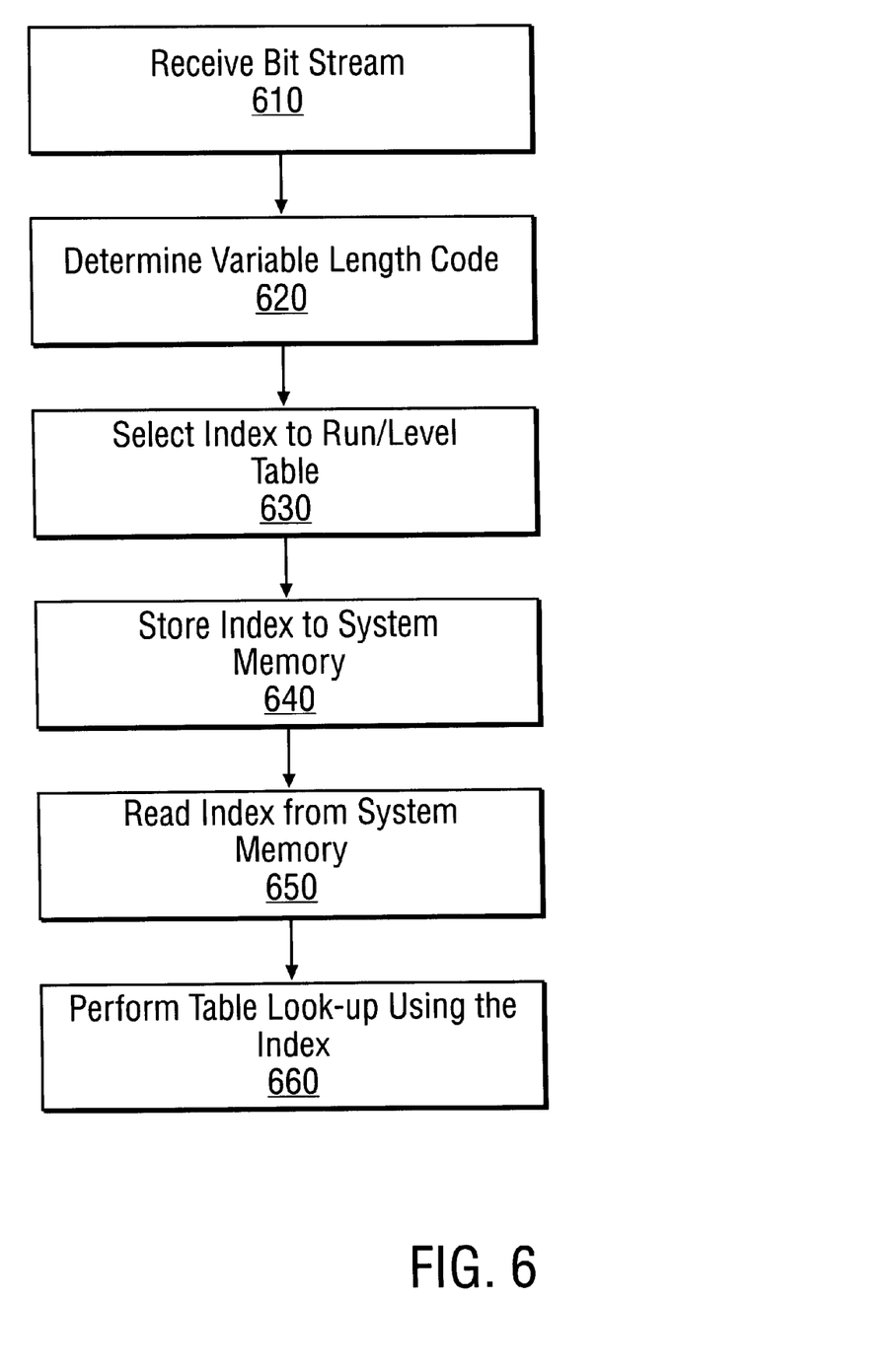
FIG. 6 is a flow chart of a method for decoding variable length encoded information implemented in accordance with the invention.

FIG. 6 is a flow chart of an embodiment of a method for decoding variable length encoded information. At step 610 a bit stream on variable length encoded information is received. In step 620 a variable length code is determined from the bit stream. Following the determination of the variable length code, an index to a run/level table is selected based on the variable length code at step 630. The index is stored to system memory at step 640. After the index is stored to system memory, the index is read from system memory at step 650. A table look up is performed at step 660 using the index.

Figure 7:
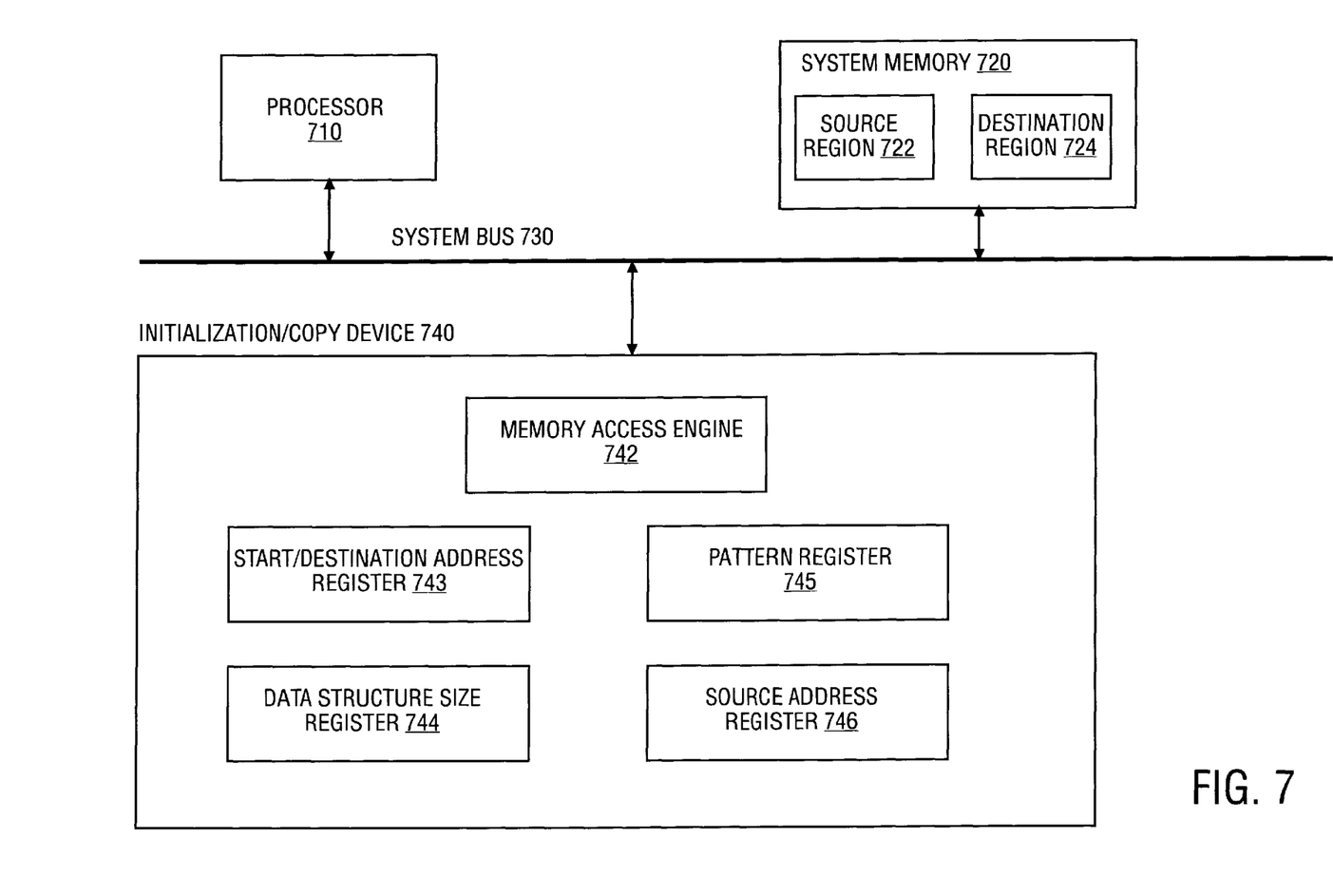
FIG. 7 is a block diagram of a system including a data structure initialization/copy device implemented in accordance with the invention.

FIG. 7 is a block diagram of a system including a data structure initialization/copy device implemented in accordance with the invention. The system of FIG. 7 includes a processor 710 coupled to a system bus 730. Also included in the system of FIG. 7 and coupled to the system bus 730 is a system memory 720 and an data structure initialization/copy device 740. The system memory 720 includes a source region 722 and a destination region 724. The data structure initialization/copy device 740 includes a memory access engine 742, a start/destination address register 743, a data structure size register 744, a pattern register 745, and a source address register 746.

The purpose of the data structure initialization/copy device 740 is to fill a block of memory with a predetermined pattern without significant intervention from the processor 710. The processor's involvement is preferably limited to initializing the various registers in the initialization/copy device 740. The initialization/copy device 740 may assert an interrupt to the processor 710 to indicate that the memory fill or copy is completed. Alternatively, the processor can periodically poll the initialization/copy device 740 to determine when a fill or copy operation is complete. An alternative purpose of the data structure initialization/copy device 740 is to copy the contents of a block of memory from one location to another, again with minimal intervention of the processor 710.

The ability to fill a block of memory with a predetermined pattern with little involvement from the processor has many applications. One such application is filling a block table of the type discussed above in connection with FIGS. 2 and 4 with zeros. The processor would no longer need to write runs of zeros during variable length decode operations but would only need to write the level coefficients, thus reducing the processor's work load. Another application is filling a 3D graphics device's z-buffer with ones, which is oftentimes desired. By allowing the data structure initialization device 740 to write the ones to the z-buffer, the graphics device's workload is diminished and performance can be enhanced. The memory fill ability may also be useful in providing operating system security. Some operating systems write a pattern, probably all zeros or all ones, to a page of memory before assigning that page of memory to a different application. By filling the page with a pattern, all data associated with the previous application using the page is destroyed, and the new application does not have access to the eliminated data. The copy operation has the application of copying a block of video data in memory from cacheable memory space to uncacheable space. The initialization/copy device 740 allows this function to be performed with little intervention from the processor, reducing the processor's workload.

To perform the initialization, or fill, operation, the processor 710 writes a start address to the start/destination address register 743. The fill operation may be triggered by the write to the start/destination address register 743 or the processor 710 may issue a separate command to commence the operation. The size of the data structure to be initialized may be hardwired to a particular size, in which case the data structure size register 744 is optional, or the data structure size can be designated by loading a size value into the data structure size register 744. Similarly, the pattern to be written can be hardwired, in which case the pattern register 745 is optional, or the pattern can be designated by loading a pattern into the pattern register 745. For variable length decode operations, the preferred pattern is all zeros. In other words, if the pattern register is 8 bits wide, the value of 00000000 b is loaded into the pattern register 745. The memory access engine handles the task of writing the pattern, whether hardwired or designated in the pattern register 745, to a data structure in memory. The data structure is defined by the start address contained in the start/destination address register 743 and is further defined by the data structure size, whether the size is hardwired or designated in the data structure size register 744.

For copy operations, the source region 722 of memory to be copied from is defined by the address stored in the source address register 746 and further defined by the size value stored in the data structure size register 744. The destination region 724 to be copied to is defined by the address stored in the start/destination address register 743 and is again further defined by the size stored in the data structure size register 744. The destination address may also be stored in a separate register rather than sharing a register with the start address.

Figure 8:
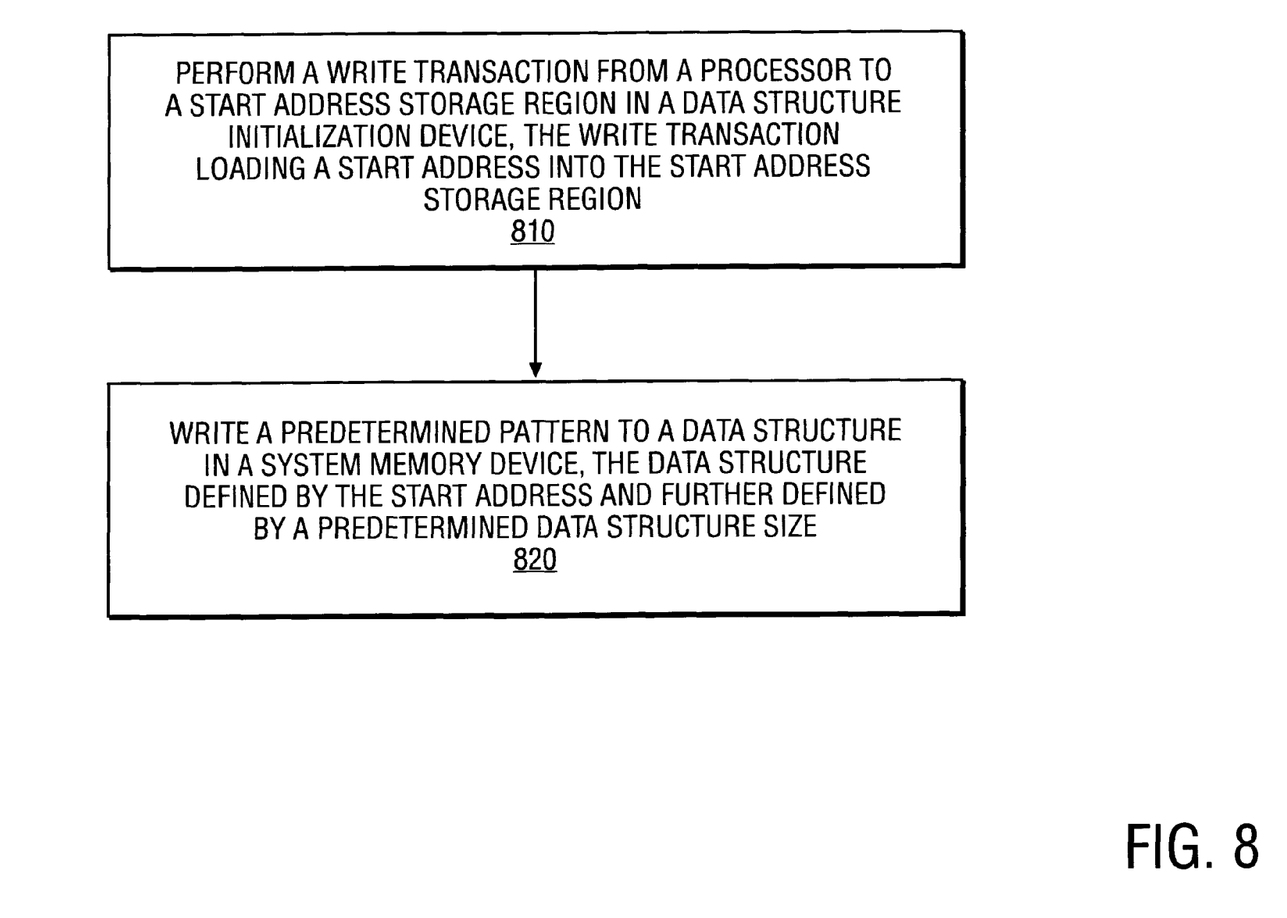
FIG. 8 is a flow chart of a method for initializing a data structure implemented in accordance with the invention.

FIG. 8 is a flow diagram of an embodiment of a method for initializing a data structure. At step 810, a write transaction is performed from a processor to a start address storage region in a data structure initialization device, the write transaction loading a start address into the start address storage region. Step 810 is followed by step 820. At step 820 a predetermined pattern is written to a data structure in a system memory device, the data structure defined by the start address and further defined by a predetermined data structure size.

In the foregoing specification the invention has been described with reference to specific exemplary embodiments thereof It will, however, be evident that various modifications and changes may be made thereto without departing from the broader spirit and scope of the invention as set forth in the appended claims. The specification and drawings are accordingly to be regarded in an illustrative rather than in a restrictive sense.

What is claimed is:

1. A computer system, comprising:

a logic device to receive a bit stream of variable length encoded information, the logic device to output a fixed length value corresponding to one of a plurality of variable length codes received as part of the bit stream of variable length encoded information to a destination in a system memory, where the fixed length value is an index to a table of coefficients, where the logic device includes a register to receive the bit stream of variable length encoded information and a decode circuit coupled to receive a plurality of bits of variable length encoded information from the register and outputs the fixed length value, and where the plurality of bits includes the one of the plurality of variable length codes; and a processor to receive the fixed length value by reading the fixed length value from the destination location in the system memory, and to perform a write of a coefficient to the system memory device using the table of coefficients, the coefficient corresponding to the fixed length value received from the logic device, where the processor uses the index to read from the table of coefficients to determine the coefficient corresponding to the fixed length value.

2. The system of claim 1 wherein the table of coefficients is stored in the system memory.

3. The system of claim 1 wherein the logic device further includes a buffer coupled to receive the fixed length value from the decode circuit, and a memory access engine to deliver the fixed length value from the buffer to the destination location.

4. The system of claim 3 wherein the logic device further includes an input queue to receive the bit stream of variable length encoded information, the input queue coupled to output the bit stream to the register.

5. The system of claim 4 wherein the decode logic is configured to output a shift control signal to the register, the shift control signal to indicate to the register the length of the one of the plurality of variable length codes.

6. A computer system, comprising:

means for receiving a bit stream of variable length encoded information;

means for outputting a fixed length value corresponding to one of a plurality of variable length codes received as part of the bit stream of variable length encoded information to a destination location in a storage means, where the fixed length value is an index to a table of coefficients, the means for outputting coupled to the means for receiving the bit stream;

means for receiving the fixed length value by reading the fixed length value from the destination location; and means for performing a write of a coefficient to the storage means using the index to read from the table of coefficients to determine the coefficient corresponding to the fixed length value, the means for performing a write coupled to the means for receiving the fixed length value.

* * * * *